(12) United States Patent
Boyle et al.

(10) Patent No.: US 8,501,107 B2
(45) Date of Patent: Aug. 6, 2013

(54) APPARATUS FOR GENERATING MERCURY (II) SULFIDE FROM ELEMENTAL MERCURY

(75) Inventors: John M. Boyle, Slatedale, PA (US); Bruce J. Lawrence, Bethlehem, PA (US); Scott A. Schreffler, Bethlehem, PA (US)

(73) Assignee: Bethlehem Apparatus Company, Inc.

( * ) Notice: Subject to any disclaimer, the term of this patent is extended or adjusted under 35 U.S.C. 154(b) by 646 days.

(21) Appl. No.: 12/710,067

(22) Filed: Feb. 22, 2010

(65) Prior Publication Data
US 2010/0150795 A1   Jun. 17, 2010

Related U.S. Application Data

(62) Division of application No. 12/255,403, filed on Oct. 21, 2008, now Pat. No. 7,691,361.

(51) Int. Cl.
| | |
|---|---|
| *B01J 19/00* | (2006.01) |
| *B01J 8/00* | (2006.01) |
| *B01J 3/00* | (2006.01) |
| *B01D 53/34* | (2006.01) |
| *B01D 53/46* | (2006.01) |
| *B01D 53/86* | (2006.01) |
| *C01B 17/00* | (2006.01) |
| *A62D 3/00* | (2007.01) |

(52) U.S. Cl.
USPC ............ 422/198; 422/129; 422/187; 422/242; 423/210; 423/212; 423/511; 423/565; 588/256

(58) Field of Classification Search
USPC ................. 422/129, 187, 198, 242; 423/210, 423/212, 511, 561.1, 565, 566.1; 588/256, 588/252
See application file for complete search history.

(56) References Cited

U.S. PATENT DOCUMENTS

| | | | |
|---|---|---|---|
| 3,061,412 A * | 10/1962 | Giordano | 423/565 |
| 5,268,152 A | 12/1993 | Delzer et al. | |
| 5,298,227 A | 3/1994 | Hirth et al. | |
| 6,053,187 A | 4/2000 | Altomonte | |
| 6,156,281 A | 12/2000 | Akers et al. | |
| 6,214,304 B1 * | 4/2001 | Rosenthal et al. | 423/210 |
| 6,399,849 B1 | 6/2002 | Kalb et al. | |
| 6,403,044 B1 | 6/2002 | Litz et al. | |
| 6,579,507 B2 | 6/2003 | Pahlman et al. | |
| 7,060,233 B1 | 6/2006 | Srinivas et al. | |
| 2004/0219083 A1 | 11/2004 | Schofield | |
| 2005/0089437 A1 | 4/2005 | Kano et al. | |
| 2006/0216417 A1 * | 9/2006 | Todd et al. | 427/248.1 |
| 2007/0180802 A1 | 8/2007 | Parker et al. | |
| 2008/0019900 A1 | 1/2008 | Riviere-Huc et al. | |

OTHER PUBLICATIONS

International Search Report and Written Opinion, PCT/US08/80642, Dec. 24, 2008, pp. 1-11.

(Continued)

*Primary Examiner* — Walter D Griffin
*Assistant Examiner* — Natasha Young
(74) *Attorney, Agent, or Firm* — Ditthavong Mori & Steiner, P.C.

(57) ABSTRACT

An apparatus is provided for generating mercury (II) sulfide from elemental mercury. Elemental mercury is injected into a heated and sealed reaction vessel containing vaporized sulfur. The elemental mercury reacts with at least a portion of the vaporized sulfur to form the mercury (II) sulfide within the reaction vessel. The formed mercury (II) sulfide is then unloaded from the reaction vessel.

10 Claims, 7 Drawing Sheets

OTHER PUBLICATIONS

Science Applications International Corporation Engineering and Environmental Management Group, "Technical Background Document: Mercury Wastes Evaluation of Treatment of Bulk Elemental Mercury Final Report", Feb. 8, 2002, 379 P, Reston, Virginia, United States.

* cited by examiner

APPARATUS FOR GENERATING MERCURY (II) SULFIDE FROM ELEMENTAL MERCURY

RELATED APPLICATIONS

This application is a divisional application and claims the benefit of the earlier filing date under 35 U.S.C. §121 of U.S. application Ser. No. 12/255,403 filed Oct. 21, 2008, entitled "A Method and Apparatus for Generating Mercury (II) Sulfide from Elemental Mercury," the entirety of which is incorporated herein by reference.

BACKGROUND OF THE INVENTION

The international community has imposed an increasing number of restrictions on the movement and commercial uses of mercury. For instance, some countries have adopted or are experimenting with adopting complete bans on the export of elemental mercury. Once adopted, a mercury ban is likely to have the effect of increasing the supply of elemental mercury beyond the demand for the substance within the affected region. As a result, countries adopting an export ban on elemental mercury could see growing surpluses of mercury.

As noted by the European Union and the United States during debates over their respective mercury regulations, a surplus of elemental mercury is particularly problematic because there is currently no viable long-term storage or disposal technique for elemental mercury. As such, surplus mercury is most commonly stored in its elemental form in iron flasks. These iron flasks are then warehoused and monitored to ensure their ongoing integrity. The long-term strength and durability of these iron flasks is, at least, debatable and, therefore, great concern over potential environmental hazards exists. In response, both the European Union and the United States have cited a need for the development of new technologies capable of converting elemental mercury into solid mercury compounds that are suitable for long-term storage and disposal.

Even in the absence of a mercury ban, some generators of elemental mercury would like to avoid being forced to sell their surplus mercury on the world market. Currently, the law in many jurisdictions (e.g., the United States) requires that all mercury must be sold or recycled. This requirement forces mercury generators to sell their mercury to avoid having to store the mercury indefinitely. The development of a viable mercury treatment option could give mercury generators an alternative to selling their mercury.

Therefore, there is a need for an approach capable of generating a stable solid compound of elemental mercury. A particular need exists for reaction processes capable of minimizing or eliminating the presence of elemental mercury residuals in the resulting mercury compound.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method and apparatus for generating mercury (II) sulfide from elemental mercury are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
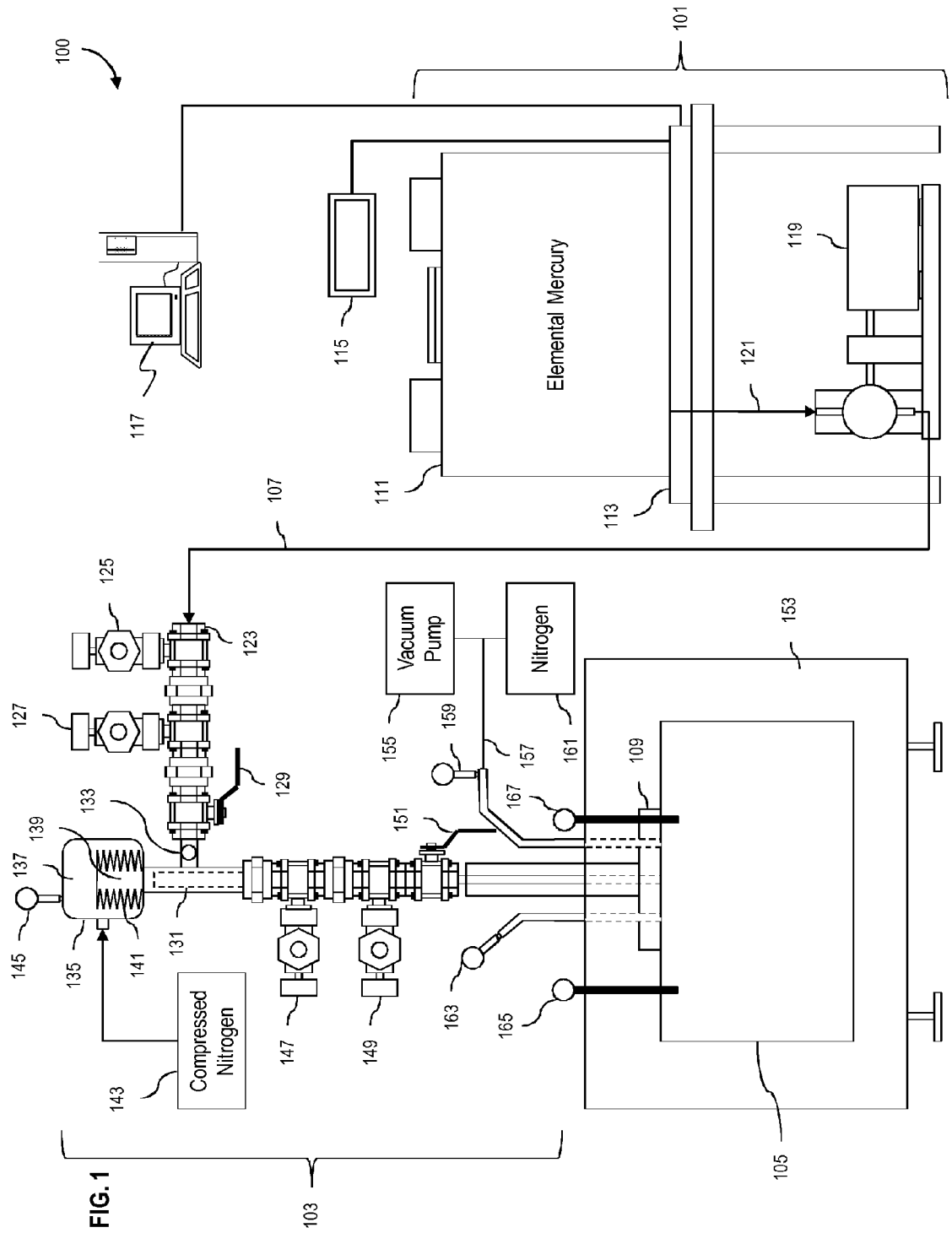
FIG. 1 is a schematic diagram of a system for generating mercury (II) sulfide from elemental mercury, according to an exemplary embodiment.

FIG. 1 is a schematic diagram of a system for generating mercury (II) sulfide from elemental mercury, according to an exemplary embodiment. In this example, system 100 includes elemental mercury source 101, injection system 103, and reaction vessel 105. While specific reference will be made to these components and their individual parts and configurations, it is contemplated that system 100 may embody many forms and include multiple and/or alternative components and configurations.

According to one embodiment, system 100 utilizes reaction vessel 105 capable of maintaining sufficient reactive conditions (e.g., pressure, temperature, volume, etc.) for vaporizing and combining elemental mercury with sulfur. In exemplary embodiments, this process begins under a non-reactive atmosphere and vacuum. It is noted that the vaporization of elemental mercury and sulfur facilitates a more complete reaction between the substances introduced to reaction vessel 105. As a consequence, system 100 is capable of, but is not limited to, generating mercury (II) sulfide containing no (or substantially no) detectable levels of residual elemental mercury.

Traditionally, mercury (II) sulfide generation technologies have relied on physically mixing or blending elemental mercury with sulfur at relatively low temperatures (e.g., room temperature or slightly there above). These technologies, however, fail to completely purge residual elemental mercury from generated mercury (II) sulfide. Namely, the reaction between the source elemental mercury and the sulfur reagent is not complete. This occurs primarily because the elemental mercury divides into microscopic beads during physical agitation. The microscopic beads of mercury do not readily interact with the sulfur reagent to generate mercury (II) sulfide and, for the most part, remain unreacted. Unreacted elemental mercury results in significant amounts of detectable residual elemental mercury in the produced mercury (II) sulfide.

Furthermore, the approach of system 100, according to certain embodiments, stems from the recognition that reacting elemental mercury with sulfur under high temperature and pressure conditions, creates a more stable, less soluble form of mercury (II) sulfide (i.e., red mercury (II) sulfide, also known as cinnabar). It is noted that mercury (II) sulfide generally occurs in two crystalline forms: a hexagonal crystalline form known as red mercury (II) sulfide and a cubic tetrahedral crystalline form known as black mercury (II) sulfide. While both forms are considered inert and insoluble in water and in most acidic conditions, the water solubility of red mercury (II) sulfide (e.g., $K_{sp}=3.0\times10^{-53}$ $M^2$) is lower than the solubility for black mercury (II) sulfide (e.g., $K_{sp}=1.9\times10^{-15}$ $M^2$). Thus, red mercury (II) sulfide dissolves less readily than black mercury (II) sulfide under normal environmental conditions. Accordingly, system 100, in exemplary embodiments, is configured to produce red mercury (II) sulfide. In certain instances, the produced red mercury (II) sulfide is greater than 99.9% pure and is free (or substantially free) of detectable (or trace) amounts of residual elemental mercury.

As previously mentioned, governmental restrictions and regulations are driving the need for an approach capable of converting elemental mercury into stable, solid compounds that are suitable for long-term storage and disposal. For example, the U.S. Environmental Protection Agency (EPA) has historically favored regulations that promote the recycling and recovery of elemental mercury for commercial use over treatment and disposal of elemental mercury. However, EPA has come to recognize that as more regulations restrict the commercial uses of mercury, future commercial demand for mercury could become much less than the available supply. Continued recycling of elemental mercury under these circumstances could contribute to a growing worldwide surplus of elemental mercury. Therefore, EPA has acknowledged that the treatment and disposal of elemental mercury is a potential solution to the problem of surplus elemental mercury. In addition, many generators of elemental mercury would like to avoid selling mercury on the world market and need a viable option for treating their excess elemental mercury.

Accordingly, various exemplary embodiments of system 100 stem from the need to convert surplus elemental mercury into a stable, solid compound that can be either disposed of or stored over long durations while minimizing the risk of potential environmental contamination.

As seen in FIG. 1, system 100 includes elemental mercury source 101 detachably coupled to injection system 103 via supply line 107 that, in exemplary embodiments, is pressurized for the delivery of relatively high pressure elemental mercury. Injection system 103 is, in turn, detachably coupled to reaction vessel 105 via flange 109. According to certain embodiments, elemental mercury source 101 includes mercury supply container 111 having a predetermined elemental mercury storage capacity, such as 2,000 lbs of elemental mercury. It is contemplated, however, that any suitable storage capacity can be utilized. Supply container 111 stores elemental mercury for later reaction within reaction vessel 105 and can be mounted on, for instance, deck scale 113 including or coupled to digital readout 115. Deck scale 113 is used, in exemplary embodiments, to monitor the amount of elemental mercury processed by system 100. Namely, by performing continuous, periodic, or on-demand measurements of the weight of supply container 111 and the elemental mercury contained therein, system 100 can track the amount of elemental mercury introduced during a reaction process, such as the mercury (II) sulfide reaction process of FIG. 3. In other words, a change in weight indicates an amount of elemental mercury processed or being processed. In certain embodiments, deck scale 113 communicates with a control system 117, such as a computing device, to provide for automated monitoring and control of elemental mercury source 101. It is contemplated that the control system may communicate with deck scale 113 (or any another suitable component of system 100) over one or more communication networks, such as any suitable wired or wireless local area network (LAN), metropolitan area network (MAN), wide area network (WAN), etc. As such, system 100 can be configured for remote monitoring and/or controlling.

Elemental mercury source 101 also includes pump 119 coupled to storage container 111 via supply line 121. In exemplary embodiments, pump 119 is capable of pumping elemental mercury at relatively high pressures. As such, pump 119 can draw and pressurize elemental mercury from supply container 111 via supply line 121 and can deliver the pressurized elemental mercury to injection system 103 via supply line 107. Accordingly, supply lines 107 and 121 can be manufactured from materials (e.g., iron, iron alloy, steel, steel alloy, etc.) of sufficient strength to withstand the relatively high pressures generated when pumping elemental mercury from supply container 111 to injection system 103. It is contemplated that alternate means of feeding elemental mercury to injection system 103 (e.g., manual loading, gravity feed, etc.) may be used in lieu of, or in addition to, one or more of the components described above with respect to elemental mercury source 101.

According to exemplary embodiments, injection system 103 is detachably coupled to supply line 107 of elemental mercury source 101 through inlet 123. Inlet 123 provides an input to a valve assembly that includes valves 125 and 127, as well as shutoff valve 129. The valve assembly directs the flow of elemental mercury (such as pressurized elemental mercury) from elemental mercury source 101 to injection system 103 by opening and closing one or more of valves 125, 127, or 129 to either permit or block the flow of elemental mercury. Shutoff valve 129 is provided as a safety shutoff valve and can, therefore, block the flow of elemental mercury into injection system 103 even when valves 125 and 127 are in an open (or relatively open) position (or state). It is contemplated that alternate embodiments of injection system 103 may include only one valve or any number of valves to manage the flow of elemental mercury from elemental mercury source 101 to injection system 103. In this manner, opening valves 125 and 127, as well as shutoff valve 129 enables elemental mercury to flow from elemental mercury source 101 to mercury reservoir 131 of injection system 103. Injection system 103 enables elemental mercury to flow in only one direction, i.e., from inlet 123 of the valve assembly to mercury reservoir 131. Mercury backflow from mercury reservoir 131 to the valve assembly is blocked, in exemplary embodiments, by ball check valve 133. That is, any pressure from a backflow of mercury forces the ball of ball check valve 133 against an outlet of the valve assembly (e.g., an outlet of safety valve 129) and, thereby, closes off the pathway to potential reverse flows of elemental mercury.

Mercury reservoir 131 can store elemental mercury pumped from elemental mercury source 101 for injection in reaction vessel 105. In exemplary embodiments, one end of reservoir 131 is connected to pressure accumulator 135 that stores (or generates) sufficient pressure to inject the elemental mercury of mercury reservoir 131 into reaction vessel 105. Accordingly, pressure accumulator 135 can also store enough pressure to provide sufficient energy to clear any obstructions in the injection feed lines (e.g., deposits of mercury (II) sulfide crystals; see also the discussion concerning obstructions with respect to FIGS. 4A-4C). Pressure accumulator 135 includes two chambers (i.e., gas side chamber 137 and liquid side chamber 139) separated by a bellows 141. Gas side chamber 137 of pressure accumulator 135 can be connected to, for example, compressed nitrogen source 143. In this manner, compressed nitrogen source 143 pumps compressed nitrogen to gas side chamber 137 to generate sufficient pressure therein. The pressure within pressure accumulator 135 can be monitored via pressure gauge 145, which may be a mechanical and/or electrical readout, and may interface with control system 117 so as to enable automated monitoring and controlling of mercury (II) sulfide generation processes. Although this example discusses the use of compressed nitrogen, it is contemplated that other embodiments may use any other suitable compressed gas in lieu of, or in addition to, compressed nitrogen to generate sufficient pressure in gas side chamber 137 of pressure accumulator 135.

Liquid side chamber 139 of pressure accumulator 135 can, in exemplary embodiments, directly interface with mercury reservoir 131; however, it is also contemplated that pressure accumulator 135 may include one or more additional pressure building (or generating) chambers. As shown, a direct interface enables elemental mercury to flow freely between mercury reservoir 131 and liquid side chamber 139. Additional elemental mercury can be pumped from elemental mercury source 101 into liquid side chamber 139 to increase a pressure within pressure accumulator 135, mercury reservoir 131, and/or injection system 103 as a whole. As previously mentioned, the pressure generated within injection system 103 is, in exemplary embodiments, sufficient to overcome any potential pressures within reaction vessel 105 (such as when reaction vessel 105 is heated), as well as to clear potential obstructions of the injection feed lines. It is contemplated that other means of generating sufficient pressure to inject elemental mercury into reaction vessel 105 (e.g., pneumatic actuation) may be used.

A second end of mercury reservoir 131 can interface with a second valve assembly similarly configured to the valve assembly including inlet 123. This second valve assembly includes valves 147 and 149, as well as shutoff valve 151, and can direct the flow of elemental mercury from mercury reservoir 131 to reaction vessel 105 by opening and closing to either permit or block the flow of elemental mercury. Shutoff valve 151 is provided as a safety shutoff valve and can, therefore, block the flow of elemental mercury into reaction vessel 105 even when valves 147 and 149 are in an open (or relatively open) position (or state). It is contemplated that alternate embodiments of injection system 103 may include only one valve or any number of valves to manage the flow of elemental mercury from mercury reservoir 131 to closed reaction vessel 105. In this manner, opening valves 147 and 149, as well as shutoff valve 151 enables pressure stored within pressure accumulator 135 to compress bellows 141 of pressure accumulator 135. Such compression expels a predetermined portion of the elemental mercury of mercury reservoir 131 to reaction vessel 105. After an injection cycle is complete, valves 147 and 149 can be closed to seal reaction vessel 105 and, thereby creating a closed-system for generating mercury (II) sulfide.

This second valve assembly of injection system 103 is detachably coupled to reaction vessel 105 via flange 109. Reaction vessel 105 (described in more detail with respect to FIG. 2) can be surrounded by insulation jacket 153 that contains one or more heating elements for heating reaction vessel 105 to an appropriate reaction temperature. According to particular embodiments, the heating element(s) are capable of heating reaction vessel 105 to temperatures greater than about a boiling point of sulfur (e.g., 444.6° C. at standard atmospheric pressure) and preferably, to at least about the sublimation point of mercury (II) sulfide (e.g., 583.5° C. at standard atmospheric pressure). In certain other embodiments, insulation jacket 153 also includes one or more active cooling elements for quickly cooling reaction vessel 105 from reaction temperatures to, for instance, room temperature, such as after mercury (II) sulfide has been produced via system 100. Active cooling enables system 100 to be capable of processing more elemental mercury in a given time period by shortening a period of time for cooling reaction vessel 105 between processing cycles.

In exemplary embodiments, a vacuum state is created within reaction vessel 105 at the beginning of reaction processes prior to heating reaction vessel 105. In other embodiments, reaction processes may occur without creating an initial vacuum state. To help create this initial vacuum state, a vacuum pump 155 can interface with reaction vessel 105 via, for instance, flange 109 and vacuum line 157. Vacuum line 157 may include vacuum pressure gauge 159 (such as a mechanical or electrical vacuum pressure gauge) for monitoring a level of vacuum generated by vacuum pump 155. In certain embodiments, vacuum pressure gauge 159 communicates with control system 117. Vacuum pump 155, in exemplary embodiments, creates a vacuum level of greater than about 25 in Hg within reaction vessel 105. In addition, vacuum pump 155 may be attached to a source of a compressed gas that does not react with either elemental mercury or sulfur (e.g., nitrogen gas source 161) to enable vacuum pump 155 to back fill reaction vessel 105 with the gas before achieving a target vacuum level. This backfilling purges reaction vessel 105 of reactive gases that could potentially interfere with reaction processes (e.g., purging oxygen from reaction vessel 105 to minimize oxidation of mercury and/or sulfur during reaction processes). It is noted, however, that the reaction of elemental mercury with sulfur may nonetheless proceed without this backfilling procedure. Therefore, certain embodiments do not include a source of non-reactive compressed gas for backfilling reaction vessel 105.

Reaction vessel 105 can also include, for example, a pressure gauge 163 (e.g., mechanical or electrical pressure gauge) and temperature gauges 165 and 167 to monitor one or more reaction conditions of reaction vessel 105. In certain exemplary embodiments, one or more of these gauges 163, 165, and/or 167 communicate with control system 117 so as to enable automated monitoring and controlling of mercury (II) sulfide generation processes. It is also contemplated that a second substance source and a second injection system may be provided for controlled delivery of sulfur to reaction vessel 105. Further, it is contemplated that the second substance source and the second injection system may communicate with control system 117 so as to enable automated monitoring and/or controlling of system 100.

Figure 2:
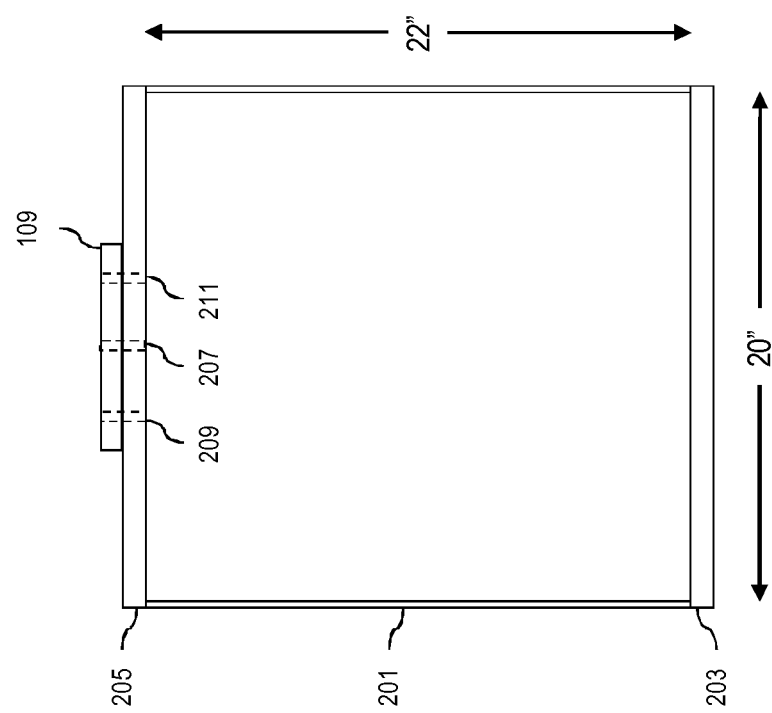
FIG. 2 is a schematic diagram of a reaction vessel, according to an exemplary embodiment.

FIG. 2 is a schematic diagram of a reaction vessel, according to an exemplary embodiment. In various embodiments, reaction vessel 105 may be a stainless steel cylindrical container measuring, for instance, substantially 22 inches in height and substantially 20 inches in diameter. A vessel of such dimensions can process approximately 400 to 500 lbs of elemental mercury per reaction process (or batch). It is contemplated that reaction vessel 105 can be alternatively sized, scaled up, or scaled down depending on an anticipated amount of elemental mercury to be processed in any given batch. According to one embodiment, reaction vessel 105 includes ¼-inch thick stainless steel wall 201, 1-inch thick bottom plate 203, and 1½-inch thick top plate 205. Again, it is noted that the dimensioning of reaction vessel 105 may be suitably modified, such as modified to accommodate reaction conditions (e.g., pressure, temperature, volume, etc.) of reaction vessel 105. Top plate 205 includes an opening and one or more attachment points (or positions) for flange 109. Flange 109 is, in exemplary embodiments, a 1½-inch thick ANSI/ASME Class 300 flange including opening 207 for attaching injection system 103, opening 209 for attaching pressure gauge 163, and opening 211 for attaching vacuum line 157 and vacuum pump 155. As previously mentioned, flange 109 can be detachably coupled to top plate 205 to enable loading of sulfur reagent and unloading of mercury (II) sulfide from reaction vessel 105. The details of reaction vessel 105 are exemplary, and it is contemplated that any equivalent specifications or construction of reaction vessel 105 may be used provided the vessel is sufficiently robust to withstand the reactive conditions (e.g., pressure, temperature, volume, etc.) generated during mercury (II) sulfide generation. Reaction vessel 105 also can be constructed of any suitable material that does not readily react with either elemental mercury or sulfur. As previously mentioned, it is also contemplated that a second substance source and a second injection system may be provided for controlled delivery of sulfur to reaction vessel 105. In this manner, reaction vessel 105 may include another flange 109 for attaching the second injection system, or illustrated flange 109 may include another opening for attaching the second injection system. Similarly, reaction vessel 105 may also include another flange 109 or opening to facilitate loading of reagents and unloading of mercury (II) sulfide without the need to remove the injection system 103.

Figure 3:
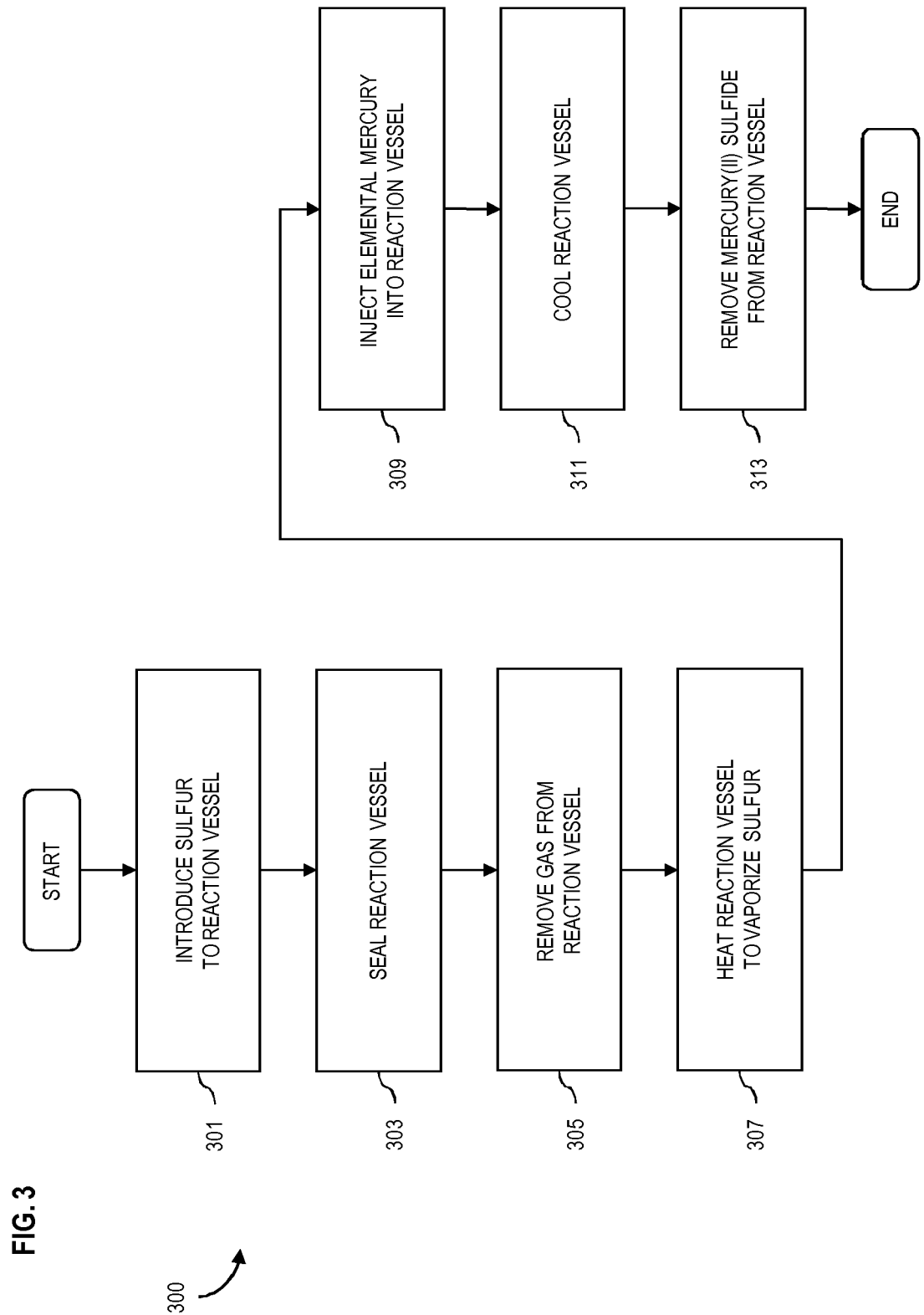
FIG. 3 is a flowchart of a process for generating mercury (II) sulfide from elemental mercury, according to an exemplary embodiment.

FIG. 3 is a flowchart of a process for generating mercury (II) sulfide from elemental mercury, according to an exemplary embodiment. For illustrative purposes, process 300 is described with respect to FIG. 1. It is noted that the steps of process 300 may be performed in any suitable order, as well as combined or separated in any suitable manner. Further, process 300 may be monitored and/or controlled via control system 117, which may communicate with system 100 via one or more communication networks.

Process 300 begins with the addition of, for instance, pure reagent-grade sulfur to reaction vessel 105 (step 301). It is noted that when the sulfur is introduced to reaction vessel 105, reaction vessel 105 is, in exemplary embodiments, substantially clean and at substantially room temperature at, for instance, atmospheric pressure. According to one embodiment, the sulfur can be added to reaction vessel 105 by removing flange 109 from reaction vessel 105 to access an inner cavity region of reaction vessel 105. Additionally (or alternatively), the sulfur may be delivered via the aforementioned second substance source and the second injection system under control of, for instance, the aforementioned control system. An amount of sulfur added to reaction vessel 105 should be greater than the amount stoichiometrically needed to fully react with an amount of elemental mercury to be processed. Accordingly, the amount of sulfur added, per step 301, is slightly greater than the amount stoichiometrically needed to react with the elemental mercury. More specifically, the amount of sulfur added preferably should result in a ratio of sulfur to elemental mercury by weight of between about 0.168 to about 0.176. It is noted that by using an amount of sulfur that is only slightly more than stoichiometrically needed can reduce the amount of excess sulfur used during process 300. For example, if 400 lbs of elemental mercury are to be processed, approximately 67 lbs to 70 lbs of sulfur can be added to reaction vessel 105 at step 301.

After adding an appropriate amount of sulfur, flange 109 can be reattached to reaction vessel 105, and reaction vessel 105 can be sealed (step 303). Flange 109 forms, for instance, an airtight seal between injection system 103 and reaction vessel 105. Additionally, valves 125, 127, 147, and 149 of both the injector valve assembly and inlet valve assembly can be arranged in a closed position (or state) to help ensure a proper seal. It is noted that by utilizing the aforementioned second substance source and a second injection system, flange 109 need not necessarily be removed from reaction vessel 109, which may also facilitate ensuring a proper seal for reaction vessel 105. In exemplary embodiments, with reaction vessel 105 sealed, any gas (e.g., air) in reaction vessel 105 can be removed and, thereby, replaced by a non-reactive atmosphere (e.g., nitrogen) under vacuum before heating reaction vessel 105 (step 305). Vacuum pump 155 can be actuated to create a vacuum within reaction vessel 105 at, for instance, a level greater than 25 in Hg. Vacuum pump 155 can then backfill reaction vessel 105 with a non-reactive gas before achieving a final vacuum level. According to one embodiment, the non-reactive gas is nitrogen. It is contemplated, however, that any suitable gas (e.g., argon, etc.) that does not react with either elemental mercury or sulfur may be used to create a non-reactive atmosphere in reaction vessel 105. It is also contemplated that process 300 may omit step 305, and mercury (II) sulfide generation may proceed without creating an initial vacuum state or non-reactive atmosphere.

In step 307, the one or more electric heating elements of insulation jacket 153 can be actuated to heat reaction vessel 105 to an appropriate reaction temperature(s). Reaction vessel 105 is, in exemplary embodiments, heated to a temperature sufficient to melt and vaporize the added sulfur. For instance, reaction vessel 105 is heated to a temperature between about the boiling point of sulfur (e.g., 444.6° C. at standard atmospheric pressure) and about the sublimation point of mercury (II) sulfide (e.g., 583.5° C. at standard atmospheric pressure). More specifically, reaction vessel 105 can be heated to approximately 482.2° C. (or 900° F.). At this temperature, the vaporized sulfur will generate about 40 psi of pressure inside reaction vessel 105. The one or more heating elements can be used to maintain reaction vessel 105 at the appropriate reaction temperature. It is also contemplated that the target reaction temperature can be dependent on the internal pressure of reaction vessel 105. For example, in exemplary embodiments where reaction vessel 105 starts under vacuum, the heating temperature may be lower because the corresponding boiling point of sulfur and sublimation point of mercury (II) sulfide would be lower under vacuum.

Once the reaction vessel 105 reaches a target reaction temperature(s), elemental mercury is injected into reaction vessel 105 via injection system 103 (step 309). It is assumed that valves 125, 127, 147, and 149 are in a closed position just before step 309. In this manner, pressure accumulator 135 stores (or otherwise generates) sufficient pressure to inject elemental mercury into reaction vessel 105, which is at a heated stated. As noted earlier, other embodiments may use different techniques (e.g., a pneumatic actuator) to generate sufficient injection pressure. While valves 125, 127, 147, and 149 are in the closed position, gas side chamber 137 of pressure accumulator 135 is charged with sufficient nitrogen pressure to provide a required amount of injection pressure to overcome any pressure generated inside reaction vessel 105 containing the volatilized sulfur. In addition, it also may be necessary for pressure accumulator 135 to store (or otherwise generate) sufficient energy to overcome any obstructions in the injection feed line (see the discussion below with respect to FIGS. 4A-4C).

When gas side chamber 137 of pressure accumulator 135 is sufficiently charged, valves 125 and 127 of the inlet valve assembly are opened and pump 119 can be actuated to fill mercury reservoir 131 and/or liquid side chamber 139 of pressure accumulator 135 with, for instance, pressurized elemental mercury. As the elemental mercury fills mercury reservoir 131 and liquid side chamber 139 of pressure accumulator 135, pressure within pressure accumulator 135, now at a pre-charged state, increases. It is noted that pump 119 can continue to deliver the elemental mercury to injection system 103 until a sufficient pressure is achieved. When this pressure is achieved, pump 119 stops and valves 125 and 127 are returned to a closed state. Accordingly, valves 147 and 149 are opened enabling pressure accumulator 135 to force elemental mercury from mercury reservoir 131 and liquid side chamber 139 of pressure accumulator 135 into reaction vessel 105. Once a predetermined portion of the elemental mercury is injected, valves 147 and 149 are returned to a closed state.

On entering reaction vessel 105 (which is at a heated state), the elemental mercury volatilizes (such as immediately volatilizes or after a duration of time), reacts with the volatilized sulfur, and, thereby, forms red mercury (II) sulfide. According to one embodiment, the temperature of reaction vessel 105 is below the sublimation point of mercury (II) sulfide. As a result, the mercury (II) sulfide generated during process 300 can crystallize (such as immediately or after a duration of time) and deposit in reaction vessel 105. This crystallization can temporarily decrease the pressure within reaction vessel 105 as the volatilized sulfur is removed from the inert atmosphere of reaction vessel 105. It is noted, however, that the pressure within reaction vessel 105 will then return to its former pressure level as residual excess sulfur is volatilized to replace the reacted sulfur vapor. This sequence of pressure changes during the reaction between the volatilized elemental mercury and the volatized sulfur can be monitored to track the progress of the reaction, i.e., a drop in pressure followed by an increase to a stable pressure can indicate that the reaction is complete. If additionally elemental mercury is to be reacted, process 300 reverts to step 309. It is noted that the amount of mercury processed can be monitored via deck scale 113 of elemental mercury source 101.

After a desired amount of elemental mercury is processed, reaction vessel 105 is cooled to enable safe unloading of the mercury (II) sulfide (step 311). According to certain embodiments, an active cooling system, such as one or more cooling elements of insulation jacket 153, can rapidly cool reaction vessel 105. Reaction vessel 105 can also be cooled by simply turning off the one or more heating elements of insulation jacket 153 and allowing reaction vessel 105 to cool through natural ambient heat transfer. Once reaction vessel 105 is cooled, the mercury (II) sulfide generated within reaction vessel 105 can be removed (step 313). In certain instances, process 300 produces crusty layers of mercury (II) sulfide in reaction vessel 105 and, therefore, should also be removed. In certain embodiments, reaction vessel 109 may include an additional flange 109 or opening to facilitate the unloading of mercury (II) sulfide.

Figure 4A:
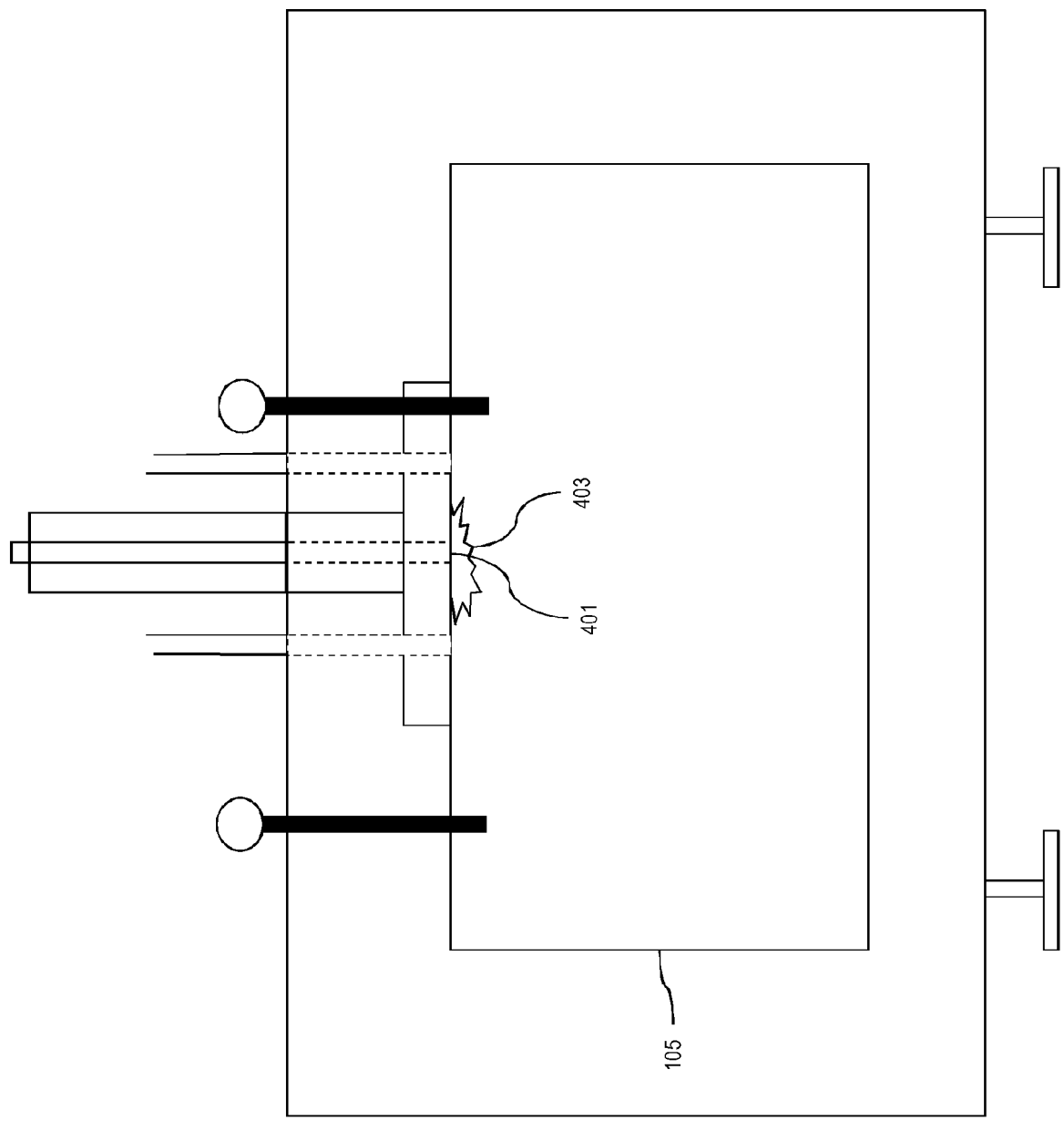
FIGS. 4A-4C are respective schematic diagrams of an injection port of a reaction vessel clogged with crystallized mercury (II) sulfide, a clogged injection port cleared by pressurized injection, and a clogged injection port cleared by mechanical means, according exemplary embodiments.
Figure 4B:
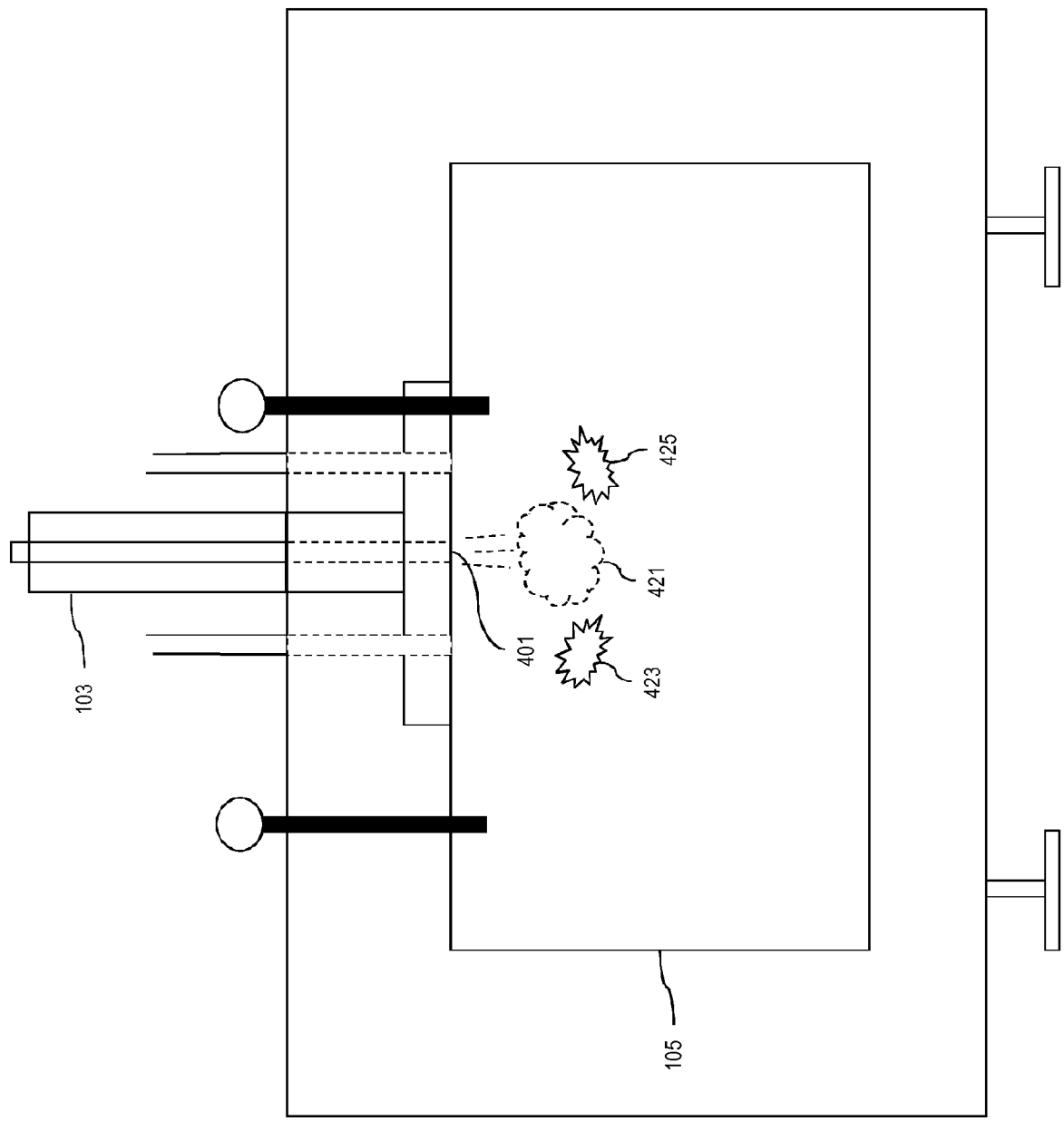
Figure 4C:
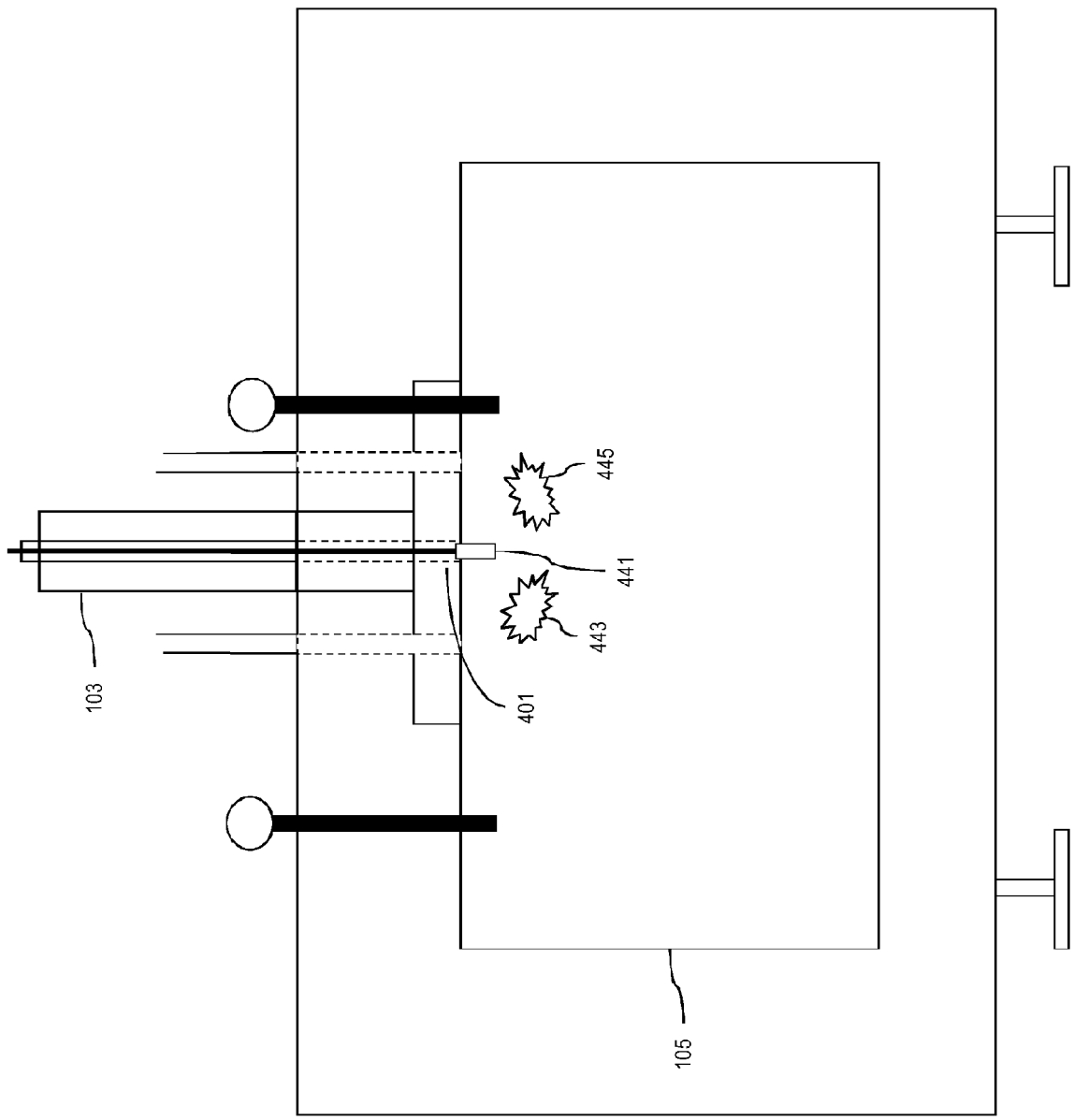

It is noted that these crusty layers of mercury (II) sulfide can frustrate the generation of mercury (II) sulfide. FIGS. 4A-4C are respective schematic diagrams of an injection port of a reaction vessel clogged with crystallized mercury (II) sulfide, a clogged injection port cleared by pressurized injection, and a clogged injection port cleared by mechanical means, according exemplary embodiments. As seen in FIG. 4A, injection port 401 of reaction vessel 105 is clogged (or otherwise obstructed) by crystals of mercury (II) sulfide 403. During injection of pressurized elemental mercury, a stream of elemental mercury exits from injection system 103 through injection port 401 and, thereby, enters reaction vessel 105. The elemental mercury stream can immediately vaporize and react with the sulfur vapor already in reaction vessel 105. As such, resulting mercury (II) sulfide crystals may form at or near injection port 401 due to the fact that such a location is often the earliest point of contact between the elemental mercury and the sulfur vapors. Over time or after repeated injections, injection port 401 can become so obstructed by the mercury (II) sulfide crystals that additional elemental mercury can be prevented from being injected into reaction vessel 105. This obstruction can, thus, limit the amount of elemental mercury that system 100 can process in any given batch.

As noted above, system 100 can include one or more methods or mechanisms for clearing potential obstructions in the injection feed line and/or injection port 401, such as a clearing method using increased pressure stored (or generated) by pressure accumulator 135 to remove obstructions in injection system 103 or at (or near) injection port 401. In this example, pressure accumulator 135 can be charged with additional nitrogen via gas side chamber 137 and/or filled with additional elemental mercury on liquid side chamber 139 to increase the injection pressure to a level sufficient to overcome both the pressure of reaction vessel 105 at a heated state, and any potential obstructions of injection system 103 and/or injection port 401. As seen in FIG. 4B, injected elemental mercury stream 421 enters reaction vessel 105 with enough energy (i.e., pressure) to remove (e.g., break apart) the mercury (II) sulfide crystals obstructing injection system 103 and/or injection port 401. Entering mercury stream 421 breaks, for example, the clog into free floating mercury (II) sulfide crystals 423 and 425 and, thereby, removes the clog.

In other embodiments, injection system 103 can be equipped with, for instance, a mechanical piston to clear obstructions from injection system 103 and/or injection port 401. As seen in FIG. 4C, injection system 103 includes mechanical piston 441. During injection of elemental mercury, mechanical piston 441 can be positioned to allow the elemental mercury to flow freely from injection system 103 to reaction vessel 105. If any hindering obstruction accumulates, such as a clog), mechanical piston 441 can be actuated to physically ram through the obstruction, e.g., the mercury (II) sulfide clog. This action can thus remove the clog by breaking the mercury (II) sulfide obstruction into smaller free-floating pieces 443 and 445.

Figure 5:
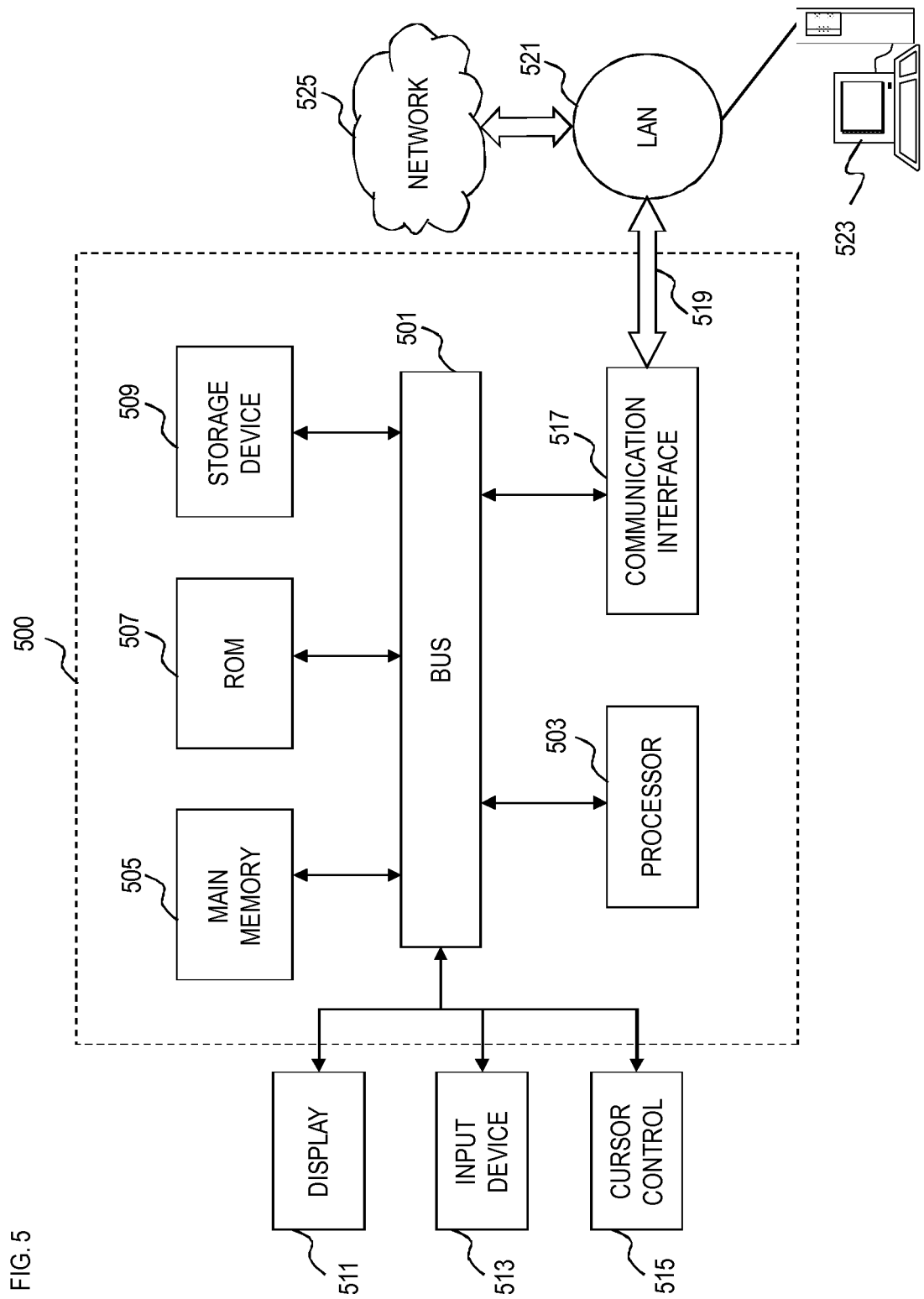
FIG. 5 is a diagram of a computer system that can be used to implement various exemplary embodiments of the process control system.

FIG. 5 is a diagram of a computer system that can be used to implement various exemplary embodiments of the process control system. The computer system 500 includes a bus 501 or other communication mechanism for communicating information and a processor 503 coupled to the bus 501 for processing information. The computer system 500 also includes main memory 505, such as random access memory (RAM) or other dynamic storage device, coupled to the bus 501 for storing information and instructions to be executed by the processor 503. Main memory 505 also can be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. An apparatus comprising:
   an injection system; and
   a reaction vessel,
   wherein the injection system is configured to inject elemental mercury from a source into the heated and sealed reaction vessel containing vaporized sulfur, the elemental mercury vaporizing and reacting with at least a portion of the vaporized sulfur to form a mercury (II) sulfide, and wherein the injection system is further configured to clear one or more obstructions from an injection port of the reaction vessel; and
   wherein the formed mercury (II) sulfide is unloaded from the reaction vessel.

2. An apparatus of claim 1, further comprising:
   one or more heating elements,
   wherein an amount of sulfur is introduced to the reaction vessel and the one or more heating elements are configured to heat the sulfur to obtain the vaporized sulfur.

3. An apparatus of claim 2, wherein the amount of sulfur is greater than an amount stoichiometrically required to fully react with a predetermined amount of elemental mercury.

4. An apparatus of claim 3, wherein a ratio of sulfur to elemental mercury by weight is between about 0.168 and about 0.176.

5. An apparatus of claim 1, wherein a system monitors an internal pressure of the reaction vessel for changes to track the formation of the mercury (II) sulfide.

6. An apparatus of claim 1, wherein the one or more obstructions corresponds to deposited mercury (II) sulfide crystals and the injection system clears the deposited mercury (II) sulfide crystals via a pressurized stream or a mechanical piston.

7. An apparatus of claim 6, wherein the pressurized stream is a pressurized stream of elemental mercury.

8. An apparatus of claim 1, wherein the reaction vessel is cooled through passive heat transfer or by an active cooling system before removing the mercury (II) sulfide.

9. A system comprising:
a reaction vessel;
a source of elemental mercury; and
a control system,
wherein the control system is configured to cause elemental mercury from the source to be introduced to the heated and sealed reaction vessel containing vaporized sulfur, the introduction of the elemental mercury causing the elemental mercury to vaporize and react with at least a portion of the vaporized sulfur reactant to form mercury (II) sulfide, and wherein the control system is further configured to clear one or more obstructions from an injection port of the reaction vessel; and
wherein the formed mercury (II) sulfide is unloaded from the reaction vessel.

10. A system as recited in claim 8, wherein the control system is accessible over one or more communication networks.

* * * * *